United States Patent
Wang et al.

(10) Patent No.: US 7,729,333 B2
(45) Date of Patent: Jun. 1, 2010

(54) USER SELECTION METHOD IN A ZERO-FORCING BEAMFORMING ALGORITHM

(75) Inventors: Jing Wang, Beijing (CN); Haibo Zheng, Beijing (CN); Yong-Xing Zhou, Yongin-si (KR); Jianjun Li, Yongin-si (KR); Sung-Jin Kim, Suwon-si (KR)

(73) Assignees: Samsung Electronics Co., Ltd (KR); Tsinghua University, Beijing (CN)

( * ) Notice: Subject to any disclaimer, the term of this patent is extended or adjusted under 35 U.S.C. 154(b) by 950 days.

(21) Appl. No.: 11/474,568

(22) Filed: Jun. 26, 2006

(65) Prior Publication Data

US 2007/0058590 A1    Mar. 15, 2007

(30) Foreign Application Priority Data

Jun. 24, 2005    (KR) .................. 10-2005-0054878

(51) Int. Cl.
*H04B 7/212*    (2006.01)
(52) U.S. Cl. ............ 370/347; 370/338; 370/342; 370/335; 455/562.1; 455/101; 455/103; 375/144; 375/145; 375/149; 375/296
(58) Field of Classification Search ............... 370/144, 370/146, 147, 335, 342, 347; 455/562.1, 455/101, 103; 375/144, 145, 149, 296
See application file for complete search history.

(56) References Cited

U.S. PATENT DOCUMENTS

| | | | |
|---|---|---|---|
| 2002/0051433 A1* | 5/2002 | Affes et al. | 370/335 |
| 2003/0087673 A1* | 5/2003 | Walton et al. | 455/562 |
| 2004/0235529 A1* | 11/2004 | Tarokh et al. | 455/562.1 |
| 2005/0002467 A1* | 1/2005 | Seo et al. | 375/267 |
| 2005/0043031 A1* | 2/2005 | Cho et al. | 455/450 |
| 2005/0130684 A1 | 6/2005 | Kim et al. | |
| 2005/0254477 A1* | 11/2005 | Lee et al. | 370/342 |
| 2006/0210070 A1* | 9/2006 | Reznik et al. | 380/33 |

FOREIGN PATENT DOCUMENTS

KR    1020050046303    5/2005

* cited by examiner

*Primary Examiner*—Rafael Pérez-Gutiérrez
*Assistant Examiner*—Nimesh Patel
(74) *Attorney, Agent, or Firm*—The Farrell Law Firm, LLP (57) ABSTRACT

In a method for selecting a transmission target terminal in a zero-forcing beamforming algorithm, information about a channel capacity of each terminal is received from all K terminals. A terminal with a largest channel capacity is selected as an initial transmission target terminal. A determination is made as to whether the number of currently selected terminals, i, is equal to the predefined number N. If the number of currently selected terminals, i, is different from the predefined number N, information about channel capacities of remaining terminals except previously selected transmission target terminals is received until i is equal to N and a terminal with a largest channel capacity is selected as a transmission target terminal.

3 Claims, 5 Drawing Sheets

USER SELECTION METHOD IN A ZERO-FORCING BEAMFORMING ALGORITHM

PRIORITY

This application claims priority under 35 U.S.C. § 119 to an application entitled "User Selection Method in a Zero-Forcing Beamforming Algorithm" filed in the Korean Intellectual Property Office on Jun. 24, 2005 and assigned Serial No. 2005-54878, the contents of which are incorporated herein by reference.

BACKGROUND OF THE INVENTION

1. Field of the Invention

The present invention generally relates to a multiuser diversity technique, and more particularly to a user selection method in a zero-forcing beamforming algorithm for obtaining a multiuser diversity gain.

2. Description of the Related Art

Recently, a large amount of research is being conducted on a beamforming technique using multiple transmit and receive antennas for increasing spectrum efficiency and satisfying high-speed data transmission service requirements in wireless communication fields. Multiuser diversity refers to channel diversity between multiuser channels for improving a channel capacity using Rayleigh fading.

For multiuser diversity, transmission target users must be selected along with transmission times. In a wireless network environment, some users have the best channel state at a certain time. At this time, transmission is performed for associated users, such that the desired overall system capacity can be obtained. A water-filling algorithm optimizes the overall multiuser capacity by allocating the optimal power and transmission rate between subcarriers. However, the water-filling algorithm is not an optimal method in a common time/user space sharing the degree of time/space freedom in which users are already linked to a channel.

From an aspect of the maximization of a sum capacity, the simplest sharing method is to allocate all the power to a user with the largest degree of freedom. In this case, other users can perform communication after their channel states are improved. When the total transmission power is fixed in a Multiple-Input Multiple-Output (MIMO) channel, a base station can guarantee a high sum capacity, as compared with the case where an associated user with the best channel is selected and all the available capacity is allocated to the associated user, by simultaneously transmitting an independent data stream to multiple users.

Because receivers are unable to be cooperative in a downlink, successful transmission is determined according to whether a transmitter can simultaneously transmit independent signals while minimizing interference between users. If the transmitter knows interference information in a given channel considering additive noise and interference when a dirty-paper precoding algorithm, such as M. Costa, Writing On Dirty Paper, IEEE Trans. Inf. Theory IT—29, No. 3, 439—441, 1983, is exploited, it can obtain the same capacity as in an interference-free environment.

However, there are problems in that the dirty-paper precoding algorithm requires a new code with interference dependency and may not actually be implemented in the base station because the algorithm is complex. On the other hand, a zero-forcing algorithm is a suboptimal algorithm, but is a significantly simple approach for a capacity-related problem. In the zero-forcing algorithm, interference between all users is forced to 0.

The zero-forcing beamforming algorithm is known which can obtain the so-called optimal dirty-paper precoding algorithm and the asymptotic sum capacity when the number of users goes to infinity. However, there is a drawback in that the zero-forcing scheme exhibits better performance at a high Signal-to-Noise Ratio (SNR), but exhibits suboptimal performance at a low SNR.

On the other hand, a Dynamic Window Constrained Scheduling (DWCS) algorithm not only can overcome the drawback of the zero-forcing scheme, but also can obtain a high sum capacity, because the access distance is reduced and some users always become adjacent to one antenna or antenna cluster with a high SNR.

In the zero-forcing scheme, the number of antennas of a base station must be more than the total number of antennas of all receivers. When this condition is satisfied, active users with channels of quality based on requirements of the zero-forcing scheme are selected, such that the multiuser diversity gain can be obtained. Accordingly, the success or failure of the zero-forcing scheme depends on a process for selecting a user with the best channel quality at low complexity. Many user selection algorithms have been proposed for the zero-forcing scheme. However, the user selection algorithms consider a situation in which most of the user terminals have one antenna and the base station requires total Channel State Information (CSI). A need exists for a user selection method capable of minimizing complexity and improving performance at the time of considering user terminals with multiple receive antennas.

SUMMARY OF THE INVENTION

It is, therefore, an object of the present invention to provide a user selection method that can improve the performance of a zero-forcing algorithm at a low Signal-to-Noise Ratio (SNR) by updating a null space for user terminals with multiple antennas and that can increase system throughput.

It is another object of the present invention to provide a method for selecting a user terminal in zero-forcing beamforming that can reduce complexity while minimizing performance degradation.

It is yet another object of the present invention to provide a method for selecting a user terminal that can guarantee the Quality of Service (QoS) for the user terminal through a proportional fair scheduling technique.

In accordance with an aspect of the present invention, there is provided a method for selecting a transmission target terminal in a zero-forcing beamforming algorithm in which a base station with multiple transmit antennas selects a predefined number N of downlink transmission target terminals using channel information received from a plurality of terminals with at least two receive antennas, including receiving information about a channel capacity of each terminal from all K terminals; selecting a terminal with a largest channel capacity as an initial transmission target terminal; determining whether the number of currently selected terminals, i, is equal to the predefined number N; and receiving information about channel capacities of remaining terminals except previously selected transmission target terminals until i is equal to N if the number of currently selected terminals, i, is different from the predefined number N, and selecting a terminal with a largest channel capacity as a transmission target terminal.

Preferably, the method further includes outputting an index set of the selected terminals if the number of selected terminals, i, is equal to the predefined number N.

Preferably, the step of receiving the information about the channel capacities from all the terminals includes broadcasting a pilot beam to all the K terminals; and receiving the information about the channel capacities of the terminals in response to the pilot beam.

Preferably, the step of selecting the transmission target terminal includes receiving a channel matrix of an associated terminal from the initial transmission target terminal; computing a null space of the received channel matrix; broadcasting a null space beam based on the null space; and receiving the information about the channel capacities from the remaining terminals except the selected transmission target terminal in response to the null space beam.

In accordance with another aspect of the present invention, there is provided a method for selecting a transmission target terminal in a zero-forcing beamforming algorithm in which a base station with multiple transmit antennas selects predefined number N of downlink transmission target terminals using channel information received from a plurality of terminals with at least two receive antennas, including broadcasting a pilot beam to all K terminals; receiving information about a channel capacity of each terminal from the terminals in response to the pilot beam; selecting a terminal with a largest channel capacity as an initial transmission target terminal; determining whether the number of currently selected terminals, i, is equal to the predefined number N; receiving a channel matrix of an associated terminal from the initial transmission target terminal if the number of currently selected terminals, i, is different from the predefined number N; computing a null space of the received channel matrix; broadcasting a null space beam based on the null space; and receiving information about channel capacities from remaining terminals except the selected transmission target terminal in response to the null space beam, and selecting a terminal with a largest channel capacity as a transmission target terminal.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Hereinafter, a user selection method in accordance with the present invention will be described in more detail with reference to the accompanying drawings.

The present invention considers two channel models, i.e., a Distributed Antenna System (DAS) and a conventional Co-located Antenna System (CAS).

The DAS indicates a Dynamic Window Constrained Scheduling (DWCS) environment with completely distributed antennas and the CAS indicates one antenna cluster of the DWCS environment with distributed clusters. As is known, the DWCS environment with the distributed clusters exhibits a high peak transmission rate. Assuming that the number of transmit antennas is M, the number of receive antennas of different user terminals is N, flat fading and quasi-static channels are taken, and channels between user terminals are independent, a received signal can be expressed as shown in Equation (1).

$$Y_k(t) = H_{w,k}(t) F_k(t) X_b(t) + W_k(t), k \in K \quad \text{Equation (1)}$$

where X is a transmit signal, W is noise and K is a set of the use indices.

An M×N matrix $H_{w,k}(t) F_k$ associated with a channel of a k-th user in a downlink considers large-scale slow fading, as well as small-scale fast fading. $H_{w,k}(t)$ is an M×M matrix with elements of i. i. d. N(0,1). In DAS which is different from the conventional CAS, transmit antennas suffer from different degrees of large-scale fading. This is expressed by an M×N diagonal matrix $F_k$. In the present invention, the large-scale fading is determined by path loss, i.e., $F_k = \text{diag}(d_{1,k}^{-\gamma/2}, d_{2,k}^{-\gamma/2}, \ldots, d_{M,k}^{-\gamma/2})$. On the other hand, $F_k = \text{diag}(d_1^{-\gamma/2}, d_2^{-\gamma/2}, \ldots, d_M^{-\gamma/2}) \cdot d_k$ in the CAS is based on the access distance between a different transmit antenna and a k-th user terminal. When a circular area of a radius r in which M antennas are located in the DAS is considered, each antenna is randomly located in an associated area with uniform probability independent of other antennas. In the CAS, M antennas are co-located. γ is the path loss exponent. In both the DAS and the CAS, user terminals are randomly located.

Figure 1:
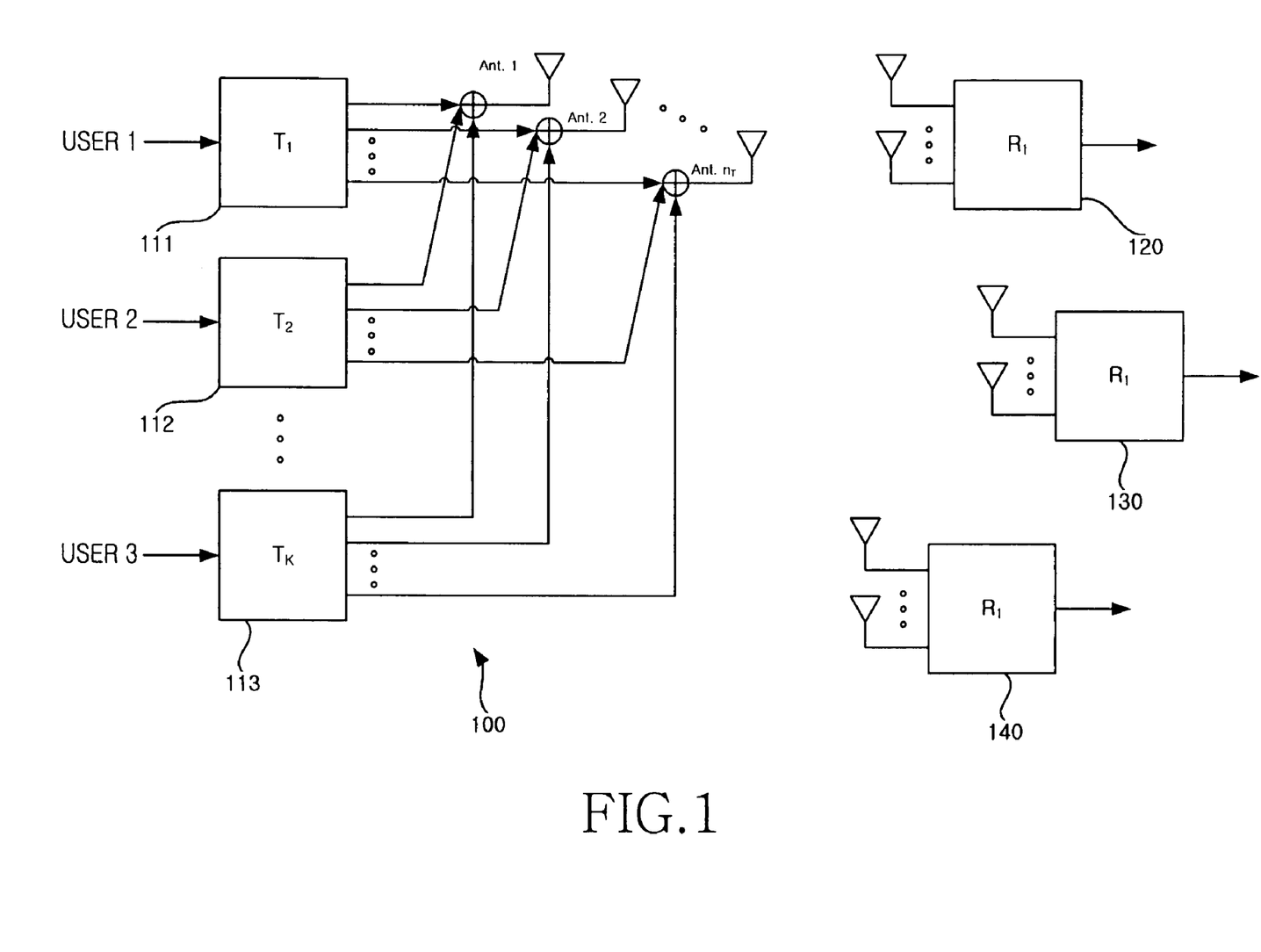
FIG. 1 illustrates a zero-forcing beamforming algorithm of a multiuser channel environment to which a user selection method in accordance with the present invention is applied.

FIG. 1 illustrates a zero-forcing beamforming algorithm of a multiuser channel environment to which a user selection method in accordance with the present invention is applied. A base station (100) multiplexes signals stored in user-by-user buffers 111, 112, and 113, transmits the multiplexed signals to $n_r$ transmit antennas. User terminals 120, 130, and 140 receive the signals through $n_{R,j}$ receive antennas.

When one base station considers a multiuser user downlink channel of K user terminals with the $n_T$ transmit antennas, a received signal of a j-th user can be expressed as shown in Equation (2) where a channel matrix for the j-th user terminal is $H_j$.

$$R_j = H_i \sum_{i=1}^{K} T_i b_i + n_j = H_j T_j b_j + H_j \tilde{T}_j \tilde{b}_j + n_j \quad \text{Equation (2)}$$

In Equation (2), $\tilde{T}_j$ and $\tilde{b}_j$ denote a beamforming matrix and a transmission vector for all user terminals except the j-th user terminal, and can be expressed by Equation (3) and Equation (4), respectively.

$$\tilde{T}_j = [T_1 \ldots T_{j-1} T_{j+1} \ldots T_K] \quad \text{Equation (3)}$$

$$\tilde{b}_j = [b_1^T \ldots b_{j-1}^T b_{j+1}^T \ldots b_k^T] \quad \text{Equation (4)}$$

In the present invention, a condition of $H_j T_j = 0$ at $i \neq j$ is set to remove all user interference components. $\tilde{H}_j = [H_1^T \ldots H_{j-1}^T H_{j+1}^T \ldots H_K^T]^T$ can be defined. $T_j$ can be placed in the null space of $\tilde{T}_j$ to satisfy a condition. On the other hand, the null space $\tilde{V}_j^0$ of $\tilde{H}_j$ can be obtained through Singular Value Decomposition (SVD) as shown in Equation (5).

$$\tilde{H}_j = \tilde{U}_j \tilde{\Sigma}_j [\tilde{V}_j^{(1)} \tilde{V}_j^0]^* \quad \text{Equation (5)}$$

A transmission vector $V_j^{(1)}$ can be obtained which maximizes an information transmission rate for the j-th user terminal through SVD of $H_j \tilde{V}_j^0$ based on Equation (6).

$$H_j \tilde{V}_j^{(0)} = U_j \begin{bmatrix} \Sigma_j & 0 \\ 0 & 0 \end{bmatrix} [V_j^{(1)} V_j^{(0)}] \quad \text{Equation (6)}$$

On the other hand, the beamforming matrix in accordance with an embodiment of the present invention can be expressed as shown in Equation (7).

$$T_s = [\tilde{V}_1^{(0)} V_1^{(1)} \tilde{V}_2^{(0)} V_2^{(1)} \ldots \tilde{V}_K^{(0)} V_K^{(1)}] \Lambda^{1/2} \quad \text{Equation (7)}$$

In Equation (7), $\Lambda$ is a diagonal matrix, and elements $\lambda_i$ of $\Lambda$ scale transmission power in columns of $T_s$. A sum capacity is computed by Equation (8).

$$C = \max \log_2 \left| I + \frac{\Sigma^2 \Lambda}{\sigma_n^2} \right|, \quad \text{Equation (8)}$$

$$\Sigma = \begin{bmatrix} \Sigma_1 & & \\ & \ddots & \\ & & \Sigma_K \end{bmatrix}$$

Optimal power loading coefficients of $\Lambda$ are computed using water filling for diagonal elements of $\Sigma$.

Next, the user selection method in the zero-forcing scheme in accordance with the present invention will be described with reference to the accompanying drawings. Assuming that N is the upper limit number of users sharing a single channel using a spatial multiplexing scheme, N user terminals with the best channel state must be selected from all K users to obtain a multiuser diversity gain.

The best result can be found by testing all possible permutations. However, it is difficult to implement a process for testing all the permutations because the process is very complex. There is a simple method that can select the N terminals with the better $H_j$. However, this method may not be regarded as an optimal method if a spatial correlation between a specific user terminal and other user terminals is not considered.

Figure 2:
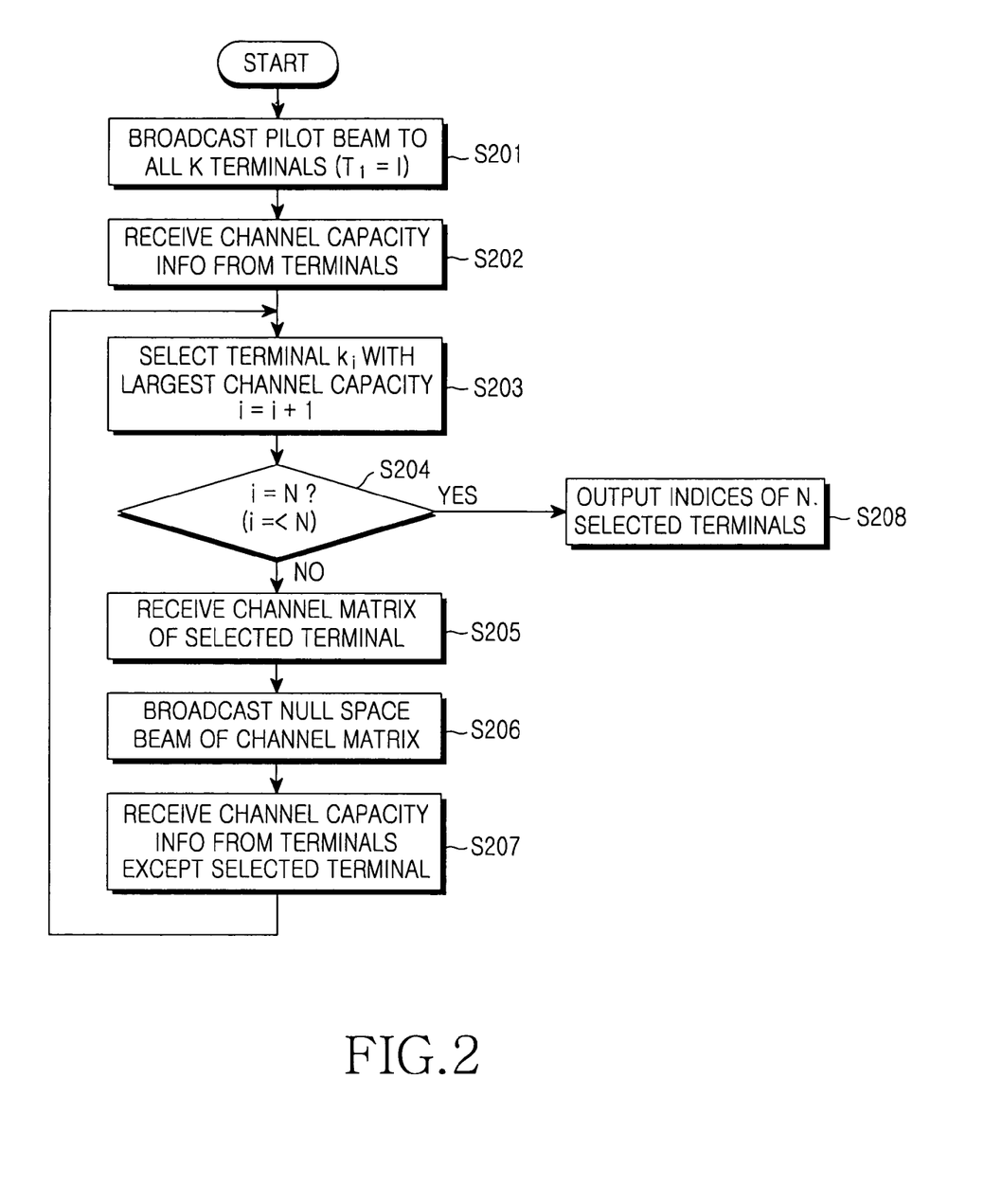
FIG. 2 is a flowchart illustrating the user selection method in the zero-forcing algorithm in accordance with the present invention.

FIG. 2 is a flowchart illustrating the user selection method in the zero-forcing algorithm in accordance with the present invention. In the user selection method in accordance with the present invention, a gradual greedy algorithm, such as Z. Tu and R. S. Blum, "Multiuser Diversity For A Dirty Paper Approach," *IEEE Commun. Lett.*, vol. 7, no. 8, pp. 370-372, August 2003, is applied to reduce complexity while minimizing performance degradation.

First, a base station broadcasts a pilot beam ($T_1 = I$) in the form of an identity matrix (Step S201), and receives feedback information corresponding to capacities $C_j(H_j T_1)$ of respective user terminals from all the user terminals (Step S202).

$$C_j(H_j T) = \max_{Q_j, tr\{Q_j\} \leq P} \log_2 |I + H_j T Q_j T^H H_j^H| \quad \text{Equation (9)}$$

In Equation (9), $Q_j$ is a transmission covariance matrix.

The base station selects User Terminal $k_1 = \arg \max_j C_j(H_j T_1)$ with the largest capacity from the user terminals (Step S203) and determines whether the number i of user terminals selected up to now is equal to N (Step S204). If the number of selected user terminals is different from N, the base station requests a channel matrix $H_{k_1}$ for the selected user terminals. Upon receiving the channel matrix $H_{k_1}$ of an associated terminal (Step S205), the base station generates a beam $T_{i+1}$ in the null space of $H_{k_1}$ based on the received channel matrix and broadcasts the generated beam to all the user terminals (Step S206).

In response to the beam $T_{i+1}$, the base station receives feedback information corresponding to capacities $C_j(H_j T_{i+1})$ of all the user terminals except User Terminal $k_1$ (Step S207). The base station selects User Terminal $k_{i+1} = \arg \max_j C_j(H_j T_{i+1})$ with the largest capacity from the user terminals (Step S203). Continuously, the base station repeats Steps S203 to S207 until the number of selected user terminals, i, is equal to N.

On the other hand, if the number of selected user terminals, i, is equal to N in step S204, the base station outputs a set of indices of the N selected terminals (Step S208) and returns to step S201.

The user selection algorithm is summarized as follows.

Step 1: Receive capacities $C_j(H_j T_1)$ of all user terminals for $T_1 = I$

Step 2: Select $k_1 = \arg \max_j C_j(H_j T_1)$

Set default values of $\Theta_1 = \{k_1\}$, $\tilde{H}_0 = \phi$, i=1

Step 3: Generate and broadcast $T_{i+1}$ in the null space of $\tilde{H}_i$ where $\tilde{H}_i = [\tilde{H}_{i-1}^T, H_{k_i}^T]$ Step 4: Transmit the capacities $C_j(H_j T_i)$ from all the user terminals on the basis of $T_i$ where i=i+1 and $j \in \{1, \ldots, K\} - \Theta_{i-1}$ Step 5: Select $k_i = \arg \max_j C_j(H_j T_i)$ where $j \in \{\{1, \ldots, K\} - \Theta_{i-1}\}$ and $\Theta_i = \Theta_{i-1} \cup \{k_i\}$ Step 6: Repeat Steps 3 to 5 until i=N Step 7: Output an index set $\Theta_i$ of the selected user terminals In the user selection method in accordance with the present invention, it is assumed that a channel state does not vary during a capacity feedback process of a user terminal. The user selection method in accordance with the embodiment of the present invention requires a Committed Information Rate (CIR) of the selected user terminals, i.e., only $H_j$ for $j \in \Theta_i$, and can be applied to a movement environment if a frame length is not very long.

The user selection method in accordance with the embodiment of the present invention exploits a URV decomposition algorithm to update the null space. Process complexity of the URV decomposition algorithm is O(p). The URV decomposition is faster than the SVD with the process complexity of $O(p^3)$.

Assuming that A has the rank k, the meaning that singular values of A satisfy a condition of $\sigma_1 \geq \ldots \geq \sigma_k > \sigma_{k+1} > \sigma_p$, A is URV decomposed as shown in Equation (10).

$$A = U \begin{pmatrix} R & F \\ 0 & G \end{pmatrix} V^H \qquad \text{Equation (10)}$$

In Equation (10), R and G are upper triangular, $\inf(R) \cong \sigma_k$, and $$\sqrt{\|F\|^2 + \|G\|^2} \cong \sqrt{\sigma_{k-1}^2 + \ldots + \sigma_p^2}.$$

From Equation (10), the null space can be extracted through an easier computation and update process than that of the SVD.

For the update process, the upper triangular matrix is induced by rotating left elements of a matrix such as $$\begin{pmatrix} R \\ x^H \end{pmatrix}.$$

$$\begin{array}{c}
\rightarrow r\ r\ r\ r \\
0\ r\ r\ r \\
0\ 0\ r\ r \\
0\ 0\ 0\ r \\
\rightarrow \tilde{x}\ x\ x\ x \\
r\ r\ r\ r \\
0\ r\ r\ r \\
0\ 0\ r\ r \\
\rightarrow 0\ 0\ 0\ r \\
\rightarrow 0\ 0\ 0\ \tilde{x}
\end{array}
\Rightarrow
\begin{array}{c}
r\ r\ r\ r \\
\rightarrow 0\ r\ r\ r \\
0\ 0\ r\ r \\
0\ 0\ 0\ r \\
\rightarrow 0\ \tilde{x}\ x\ x \\
r\ r\ r\ r \\
0\ r\ r\ r \\
0\ 0\ r\ r \\
0\ 0\ 0\ r \\
0\ 0\ 0\ 0
\end{array}
\Rightarrow
\begin{array}{c}
r\ r\ r\ r \\
0\ r\ r\ r \\
\rightarrow 0\ 0\ r\ r \\
0\ 0\ 0\ r \\
\rightarrow 0\ 0\ \tilde{x}\ x
\end{array}
\Rightarrow$$

It is preferred that the user selection method in accordance with the present invention is used along with a proportional fair scheduling algorithm to overcome a drawback of the zero-forcing scheme and guarantee the Quality of Service (QoS) for user terminals.

FIGS. 3 to 8 are graphs illustrating performance comparison results between the proposed user selection method and the conventional user selection methods.

Figure 3:
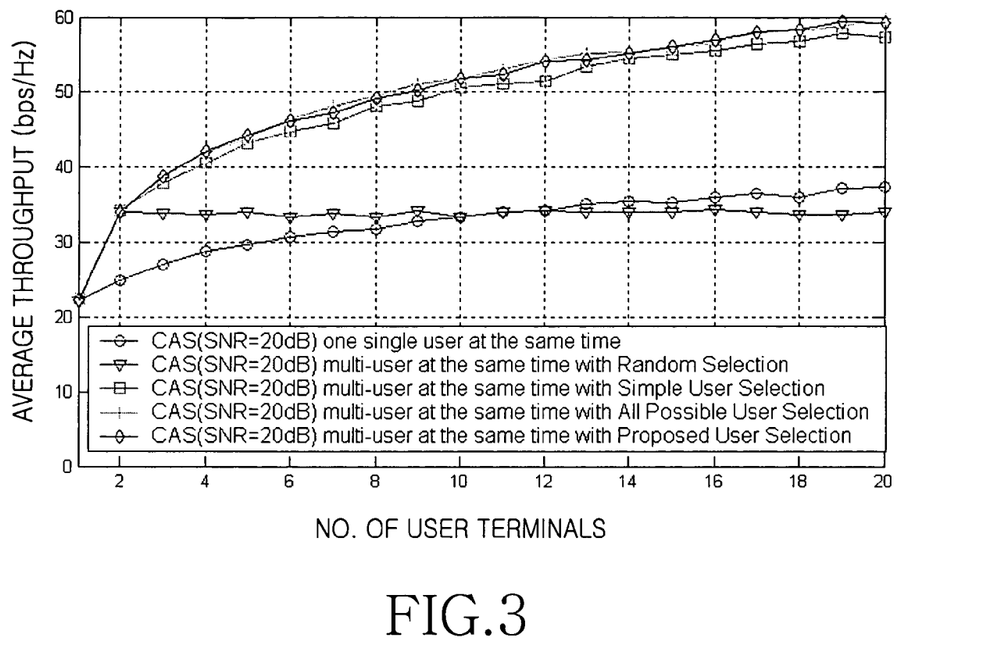
FIG. 3 is a graph illustrating variations in average throughput for a base station with four transmit antennas and the number of terminals with two receive antennas when a Signal-to-Noise Ratio (SNR) of 20 dB is applied in a Co-located Antenna System (CAS) environment.

FIG. 3 is a graph illustrating variations in average throughput for a base station with four transmit antennas and the number of terminals with two receive antennas when a Signal-to-Noise Ratio (SNR) of 20 dB is applied in a CAS environment. It can be seen that the Proposed User Selection method outperforms the Simple User Selection method almost in all regions and has almost the same performance as the All Possible User Selection method.

Figure 4:
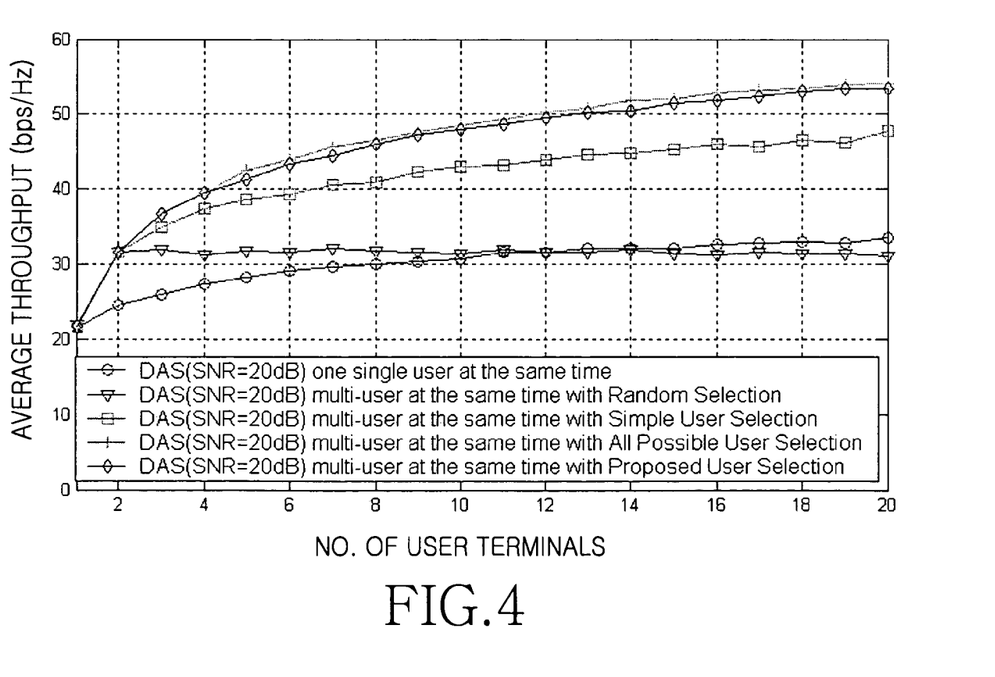
FIG. 4 is a graph illustrating variations in average throughput for a base station with four transmit antennas and the number of terminals with two receive antennas when an SNR of 20 dB is applied in a Distributed Antenna System (DAS) environment.

FIG. 4 is a graph illustrating variations in average throughput for a base station with four transmit antennas and the number of terminals with two receive antennas when an SNR of 20 dB is applied in a DAS environment. It can be seen that the Proposed User Selection method outperforms the Simple User Selection method and has throughput almost close to that of the All Possible User Selection method.

Figure 5:
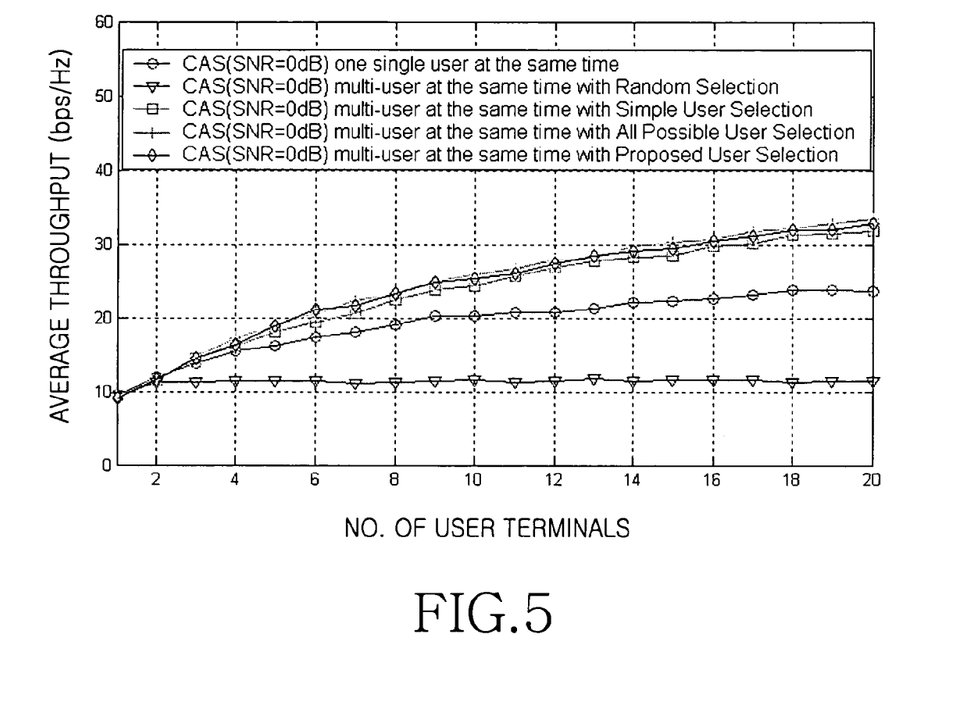
FIG. 5 is a graph illustrating variations in average throughput for a base station with four transmit antennas and the number of terminals with two receive antennas when an SNR of 0 dB is applied in the CAS environment.
Figure 6:
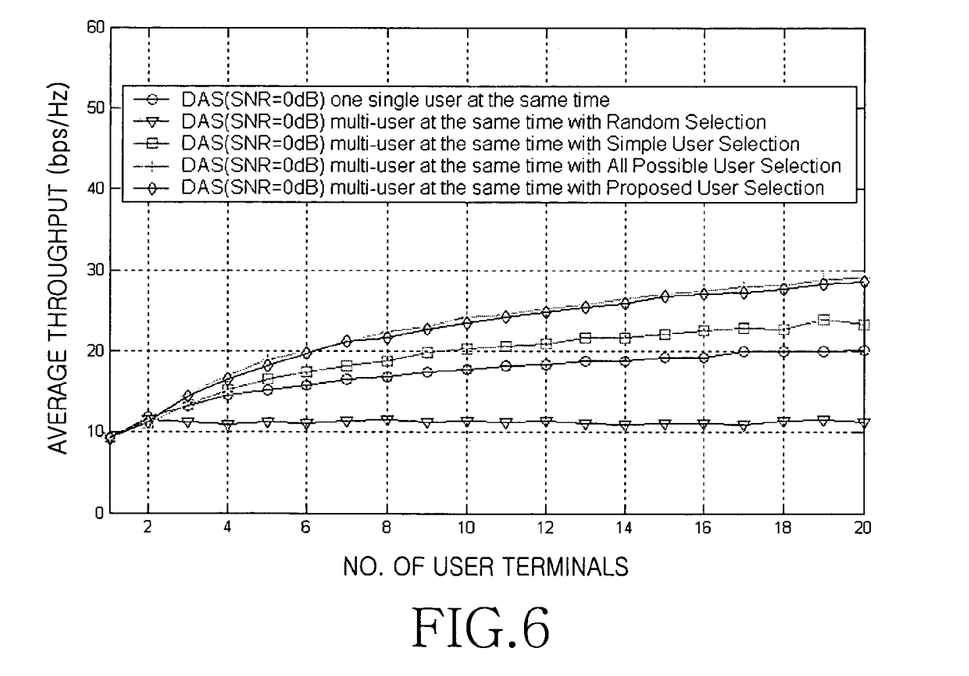
FIG. 6 is a graph illustrating variations in average throughput according to a base station with four transmit antennas and the number of terminals with two receive antennas when an SNR of 0 dB is applied in the DAS environment.

FIGS. 5 and 6 are graphs illustrating variations in average throughput for a base station with four transmit antennas and the number of terminals with two receive antennas when an SNR of 0 dB is applied in the CAS and DAS environments. In the CAS environment, the performance of the Proposed User Selection method is slightly better than that of the Simple User Selection method. In the DAS environment, the performance of the Proposed User Selection method is significantly better than that of the Simple User Selection method.

Figure 7:
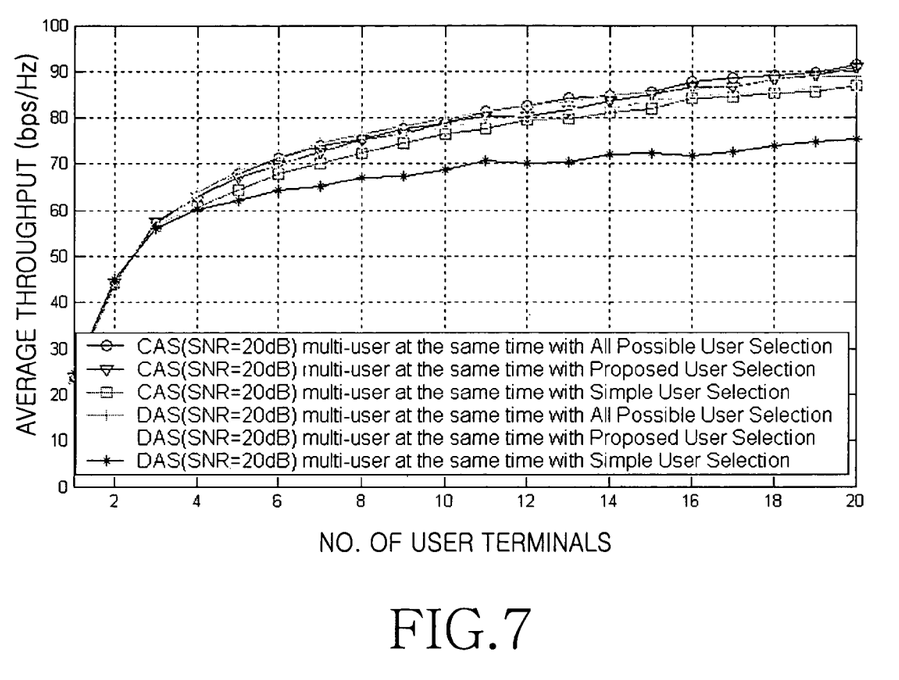
FIG. 7 is a graph illustrating performance comparison results when a base station with six transmit antennas selects terminals with two receive antennas in the CAS and DAS environments at the SNR of 20 dB.

FIG. 7 is a graph illustrating performance comparison results when a base station with six transmit antennas selects terminals with two receive antennas in the CAS and DAS environments at the SNR of 20 dB. In both the CAS and DAS environments, it can be seen that the Proposed User Selection method outperforms the Simple User Selection method.

Figure 8:
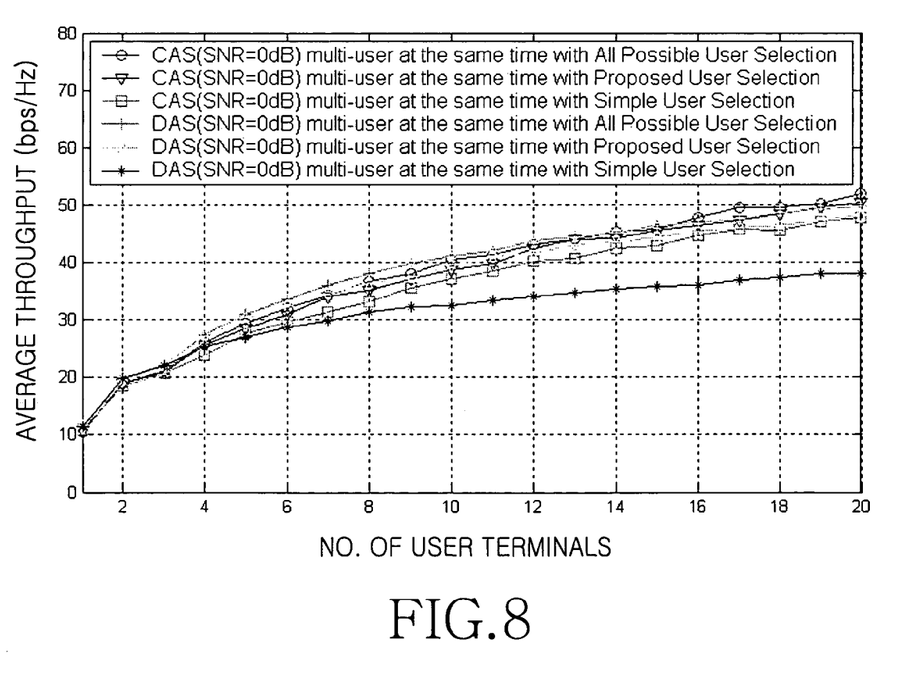
FIG. 8 is a graph illustrating performance comparison results when a base station with six transmit antennas selects terminals with two receive antennas in the CAS and DAS environments at the SNR of 0 dB.

FIG. 8 is a graph illustrating performance comparison results when a base station with six transmit antennas selects terminals with two receive antennas in the CAS and DAS environments at the SNR of 0 dB. It can be seen that the Proposed User Selection method outperforms the Simple User Selection method also at a low SNR. Specifically, in the DAS environment, it can be seen that the Proposed User Selection method is significantly improved as compared with the Simple User Selection method.

As described above, the user selection method of the present invention can reduce process complexity by updating the null space at the time of zero-forcing beamforming for multiuser scheduling and also can obtain the performance similar to that in the case where a user is selected through a series operation for all users.

Moreover, the user selection method of the present invention can reduce process complexity without performance degradation because terminals have multiple receive antennas and only channel information of a selected user terminal is required. Also, the user selection method of the present invention can define a virtual cell and also can obtain user diversity. Further, the user selection method of the present invention is used along with proportional fair scheduling, thereby guaranteeing the QoS for users.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for selecting a transmission target terminal in a zero-forcing beamforming algorithm in which a base station with multiple transmit antennas selects a predefined number N of downlink transmission target terminals using channel information received from a plurality of terminals with at least two receive antennas, comprising the steps of:

broadcasting a pilot beam to all K terminals;
receiving information about a channel capacity of each terminal from the terminals in response to the pilot beam;
selecting a terminal with a largest channel capacity as an initial transmission target terminal;
determining whether the number of currently selected terminals, i, is equal to the predefined number N;
receiving a channel matrix of an associated terminal from the initial transmission target terminal if the number of currently selected terminals, i, is different from the predefined number N;
computing a null space of the received channel matrix;

broadcasting a null space beam based on the null space; and
receiving information about channel capacities from remaining terminals except the selected transmission target terminal in response to the null space beam, and selecting a terminal with a largest channel capacity as a transmission target terminal based on the received information about the channel capacities from the remaining terminals.

2. The method of claim 1, wherein the pilot beam is a form of an identity matrix.

3. The method of claim 1, further comprising:
outputting an index set of the selected terminals if the number of selected terminals, i, is equal to the predefined number N.

* * * * *